(12) United States Patent
Lee et al.

(10) Patent No.: US 10,980,261 B2
(45) Date of Patent: Apr. 20, 2021

(54) TOMATO KETCHUP WITH IMPROVED STORAGE STABILITY

(71) Applicant: CJ CHEILJEDANG CORPORATION, Seoul (KR)

(72) Inventors: In Lee, Suwon-si (KR); Seung Won Park, Yongin-si (KR); Sung Bae Byun, Sejong (KR); Dong Seok Shim, Yongin-si (KR); Dong Chul Jung, Seoul (KR); Jong Min Choi, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 111 days.

(21) Appl. No.: 16/335,626

(22) PCT Filed: Sep. 12, 2017

(86) PCT No.: PCT/KR2017/009982
§ 371 (c)(1),
(2) Date: Mar. 21, 2019

(87) PCT Pub. No.: WO2018/066825
PCT Pub. Date: Apr. 12, 2018

(65) Prior Publication Data
US 2019/0328018 A1 Oct. 31, 2019

(30) Foreign Application Priority Data
Oct. 6, 2016 (KR) .................. 10-2016-0129260

(51) Int. Cl.
*A23L 27/60* (2016.01)
*A23L 27/40* (2016.01)
(Continued)

(52) U.S. Cl.
CPC ............. *A23L 27/63* (2016.08); *A23L 3/3562* (2013.01); *A23L 27/40* (2016.08); *C12J 1/00* (2013.01); *A23V 2002/00* (2013.01)

(58) Field of Classification Search
CPC ........ A23L 27/63; A23L 27/40; A23L 3/3562; C12J 1/00
(Continued)

(56) References Cited

U.S. PATENT DOCUMENTS

| 5,965,190 A | 10/1999 | Gallaher et al. |
| 9,655,379 B2 | 5/2017 | Aoyama et al. |

(Continued)

FOREIGN PATENT DOCUMENTS

| CL | 2017002161 A1 | 4/2018 |
| EP | 2984940 A | 2/2016 |

(Continued)

OTHER PUBLICATIONS

Homemade_Spicy.pdf "Homemade Spicy Barbecue Sauce", 2012, https://barefeetinthekitch.com/homemade-spicy-barbecue-sauce. (Year: 2012).*

(Continued)

*Primary Examiner* — Helen F Heggestad
(74) *Attorney, Agent, or Firm* — Renner, Otto, Boisselle & Sklar, LLP

(57) ABSTRACT

The present application relates to tomato ketchup with improved storage stability and a method for enhancing the storage stability of ketchup.

5 Claims, 1 Drawing Sheet

(51) Int. Cl.
*A23L 3/3562* (2006.01)
*C12J 1/00* (2006.01)

(58) Field of Classification Search
USPC .............................................. 426/303.3, 615
See application file for complete search history.

(56) References Cited

U.S. PATENT DOCUMENTS

| | | |
|---|---|---|
| 2009/0304891 A1 | 12/2009 | Fujihara et al. |
| 2012/0070534 A1 | 3/2012 | Suzuki |
| 2012/0076908 A1 | 3/2012 | Fujihara et al. |
| 2014/0030417 A1 | 1/2014 | Aoyama et al. |
| 2016/0029675 A1* | 2/2016 | Hattori et al. |
| 2018/0049458 A1 | 2/2018 | Woodyer et al. |
| 2018/0243325 A1 | 8/2018 | Choi et al. |

FOREIGN PATENT DOCUMENTS

| | | |
|---|---|---|
| EP | 3345608 A1 | 7/2018 |
| JP | 2010-200617 A | 9/2010 |
| JP | 2013-082639 A | 5/2013 |
| JP | 2014-079205 A | 5/2014 |
| KR | 10-1995-0007696 A | 7/1996 |
| KR | 10-2016-0089551 A | 7/2016 |
| KR | 10-2016-0136861 A | 11/2016 |
| WO | 2012/133759 A1 | 10/2012 |
| WO | 2014/168015 A1 | 10/2014 |
| WO | WO 2015/075473 A1 | 5/2015 |

OTHER PUBLICATIONS

Homemade_Spicy_-_Copy.pdf, pp. 1 and 6, https://barefeetinthekitch.com/homemade-spicy-barbecue-(Year: 2012).*

International Search Report, Application No. PCT/KR2017/009982, dated Dec. 19, 2017.

Hisaka Oshima et al., "Psicose Contents in Various Food Products and its Origin", Food Science and Technology Research, 2006, vol. 12, No. 2, pp. 137-143, XP055167568.

Extended European Search Report for corresponding European Patent Application No. 17858620.2 dated Apr. 20, 2020.

* cited by examiner

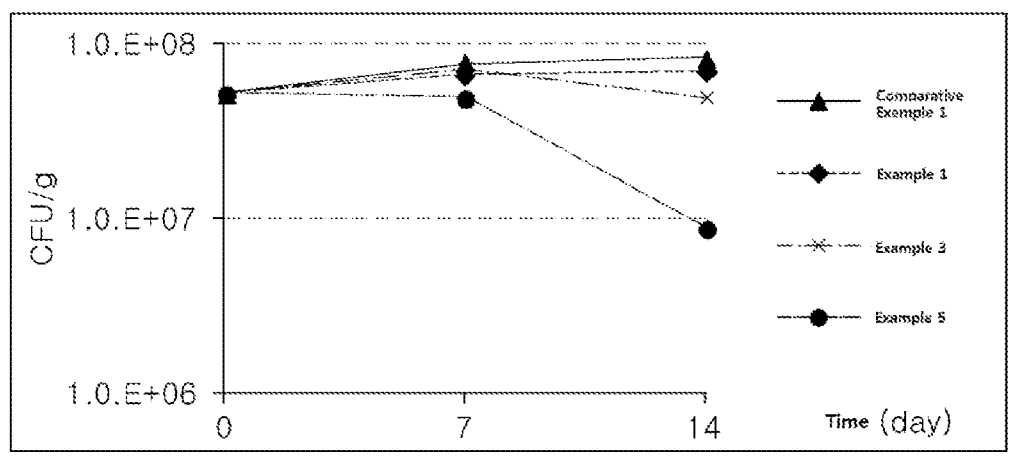

TOMATO KETCHUP WITH IMPROVED STORAGE STABILITY

FIELD OF THE INVENTION

The present invention relates to tomato ketchup with improved storage stability.

DESCRIPTION OF THE RELATED ART

Ketchup is a sauce obtained by heating a tomato concentrate made from ground tomatoes to high temperature and homogenizing the heated tomato concentrate, and is used in various foods such as hamburgers due to unique flavor and taste thereof. However, ketchup becomes reduced in palatability with increasing storage time and has low storage stability due to viscosity decrease, dehydration, and the growth and development of microorganisms.

Korean Patent No. 10-0108647 discloses a method in which isomaltooligosaccharide is added to ketchup to inhibit browning while improving storage stability of the ketchup. However, there has not been proposed a method of improving storage stability of a ketchup using allulose.

The present inventors have made efforts to develop a material capable of improving storage stability of ketchup. As a result, the present inventors found that, when allulose is added to ketchup, the ketchup can have constant viscosity and inhibit dehydration and the growth and development of microorganisms during long term storage, thereby having high preservability while retaining unique taste and flavor thereof, and thus completed the present invention.

DISCLOSURE

Technical Problem

It is one aspect of the present invention to provide a ketchup with improved preservability, which comprises a tomato concentrate, saccharides comprising allulose, vinegar, sodium chloride and purified water.

It is another aspect of the present invention to provide a method for improving preservability of a ketchup, which comprises mixing saccharides comprising allulose with a tomato concentrate, vinegar, sodium chloride, and purified water.

Hereinafter, embodiments of the present invention will be described in detail. In addition, descriptions of details apparent to those skilled in the art will be omitted for clarity.

Technical Solution

In accordance with one aspect of the present invention, a ketchup with improved preservability comprises a tomato concentrate, saccharides comprising allulose, vinegar, sodium chloride and purified water, wherein the tomato concentrate is present in an amount of 10 parts by weight to 80 parts by weight and the saccharides are present in an amount of 10 parts by weight to 40 parts by weight relative to 100 parts by weight of the ketchup.

Herein, "improvement in preservability (improved preservability)" comprises reduction in viscosity change, dehydration prevention and/or enhancement in microbial stability.

The tomato concentrate may be selected from the group consisting of tomato paste, tomato puree, and concentrated tomato juice. However, it should be understood that the present invention is not limited thereto and the tomato concentrate may comprise any typical tomato concentrate product. The tomato concentrate may have a soluble solid content of 20% by weight (wt %) or more or 24 wt % or more, specifically 20 wt % to 50 wt %, 20 wt % to 40 wt %, 20 wt % to 35 wt %, 24 wt % to 50 wt %, 24 wt % to 40 wt %, or 24 wt % to 35 wt %, based on the weight of the tomato concentrate.

The tomato concentrate may be present in an amount of 10 parts by weight to 50 parts by weight, 10 parts by weight to 40 parts by weight, 10 parts by weight to 30 parts by weight, 20 parts by weight to 80 parts by weight, 20 parts by weight to 50 parts by weight, 20 parts by weight to 40 parts by weight, 20 parts by weight to 30 parts by weight, 30 parts by weight to 80 parts by weight, 30 parts by weight to 50 parts by weight, or 30 parts by weight to 40 parts by weight, relative to 100 parts by weight of the ketchup.

The saccharides may be present in an amount of 10 parts by weight to 40 parts by weight, 10 parts by weight to 30 parts by weight, or 20 parts by weight to 30 parts by weight, relative to 100 parts by weight of the ketchup.

In addition to the allulose, the saccharides may further comprise at least one selected from the group consisting of monosaccharides, disaccharides, oligosaccharides, sugar alcohols, high-intensity sweeteners, and liquid sugars, without being limited thereto.

Herein, "monosaccharides" refer to the simplest group of carbohydrates which cannot be broken down to simpler sugars by hydrolysis with an acid, base, or enzyme. Specifically, the monosaccharides may comprise arabinose, xylose, fructose, tagatose, allose, glucose, and galactose.

Herein, "disaccharides" refer to a group of carbohydrates consisting of two monosaccharide units linked together. Specifically, the disaccharides may comprise sugar, lactose, maltose, trehalose, turanose, and cellobiose.

Herein, "oligosaccharides" refer to a group of carbohydrates consisting of 3 to 15 monosaccharide units linked together. Specifically, the oligosaccharides may comprise fructooligosaccharide, isomaltooligosaccharide, xylooligosaccharide, gentiooligosaccharide, maltooligosaccharide, and gal actooligosaccharide.

Herein, "sugar alcohols" refer to compounds obtained by reducing a carbonyl group in saccharides. Specifically, the sugar alcohols may comprise erythritol, xylitol, arabitol, mannitol, sorbitol, maltitol, and lactitol.

Herein, "high-intensity sweeteners" refer to sweeteners having a sweetness ten times or greater that of sugar. Specifically, the high-intensity sweeteners may comprise aspartame, acesulfame K, rebaudioside A, and sucralose.

Herein, "liquid sugars" refer to sugars in liquid form. For example, the liquid sugars may comprise starch syrup, honey, maple syrup, and agave syrup, without being limited thereto.

Alternatively, the saccharides may be free from sugar (sucrose), fructose, starch syrup or a combination thereof.

The allulose may be present in an amount of 40 parts by weight to 100 parts by weight, specifically 60 parts by weight to 100 parts by weight or 80 parts by weight to 100 parts by weight, relative to 100 parts by weight of the saccharides in terms of dry solid content. In addition, the allulose may be directly extracted from natural products, or may be chemically or biologically synthesized, without being limited thereto.

The vinegar may comprise apple vinegar, brown rice vinegar, corn vinegar, distilled vinegar, fermented vinegar, and brewed vinegar. However, it should be understood that the present invention is not limited thereto and the vinegar may comprise any typical edible vinegar. Specifically, the vinegar may be present in an amount of 5 parts by weight to 30 parts by weight, 10 parts by weight to 25 parts by weight, or 10 parts by weight to 20 parts by weight, relative to 100 parts by weight of the ketchup.

The sodium chloride may comprise any typical edible sodium chloride. Specifically, the sodium chloride may be present in an amount of 0.5 parts by weight to 5 parts by weight, 0.5 parts by weight to 3 parts by weight, 0.5 parts by weight to 2.5 parts by weight, 1 part by weight to 3 parts by weight, or 2 parts by weight to 3 parts by weight, relative to 100 parts by weight of the ketchup.

The purified water may be present in an amount of 20 parts by weight to 50 parts by weight, 25 parts by weight to 45 parts by weight, or 30 parts by weight to 40 parts by weight, relative to 100 parts by weight of the ketchup.

The ketchup may further comprise at least one selected from the group consisting of spices, thickeners, fruit juices, and vegetable juices.

The thickeners may be, for example, starches or gums. The starches may comprise at least one selected from the group consisting of rice starch, wheat starch, corn starch, sweet potato starch, potato starch, tapioca starch, indigestible dextrin, indigestible maltodextrin, and modified starch. The gums may be xanthan gum, guar gum, arabic gum, locust bean gum, glucomannan gum, or carrageenan gum. Specifically, the thickeners may be present in an amount of 1 part by weight to 5 parts by weight, 1.5 parts by weight to 4 parts by weight, or 2 parts by weight to 4 parts by weight, relative to 100 parts by weight of the ketchup.

The spices may comprise at least one selected from the group consisting of onion, garlic, ginger, cinnamon, pepper, clove, and nutmeg, without being limited thereto. Specifically, the spices may be in powder or liquid form. More specifically, the spices may be present in an amount of 0.1 parts by weight to 5 parts by weight, 0.5 parts by weight to 3 parts by weight, or 1 part by weight to 3 parts by weight, relative to 100 parts by weight of the ketchup.

The fruit juices may comprise, for example, banana juice, watermelon juice, melon juice, grape juice, peach juice, apricot juice, plum juice, mango juice, citrus juice, citron juice, lemon juice, strawberry juice, or grapefruit juice, without being limited thereto. In addition, the vegetable juices may comprise carrot juice or cabbage juice, without being limited thereto. The fruit juices or the vegetable juices may be extracted from a peeled and/or seeded fruit or vegetable using a juicer.

The ketchup may further comprise food ingredients (vitamins, electrolytes, flavors, colorants, pectic acid and salts thereof, alginic acid and salts thereof, organic acids, pH regulators, stabilizers, preservatives, glycerin, and carbonating agents), in addition to the components set forth above.

In accordance with another aspect of the present invention, a method for improving preservability of a ketchup comprises mixing saccharides comprising allulose with a tomato concentrate, vinegar, sodium chloride, and purified water, wherein the tomato concentrate is present in an amount of 10 parts by weight to 80 parts by weight relative to 100 parts by weight of the ketchup, and the saccharides are present in an amount of 10 parts by weight to 40 parts by weight.

The ketchup, the tomato concentrate, the vinegar, the sodium chloride, the purified water, the saccharides comprising allulose, other ingredients, and storage stability are the same as described above.

The method may further comprise sterilizing the mixture after the step of mixing. Specifically, sterilization of the mixture may be performed at 80° C. to 100° C. or 90° C. to 100° C. In addition, sterilization of the mixture may be performed for 10 minutes to 6 hours, 20 minutes to 6 hours, 30 minutes to 6 hours, 10 minutes to 3 hours, 20 minutes to 3 hours, 30 minutes to 3 hours, 10 minutes to 1 hour, 20 minutes to 1 hour, or 30 minutes to 1 hour. Sterilization of the mixture may be performed by direct or indirect heating. Specifically, indirect heating may be heating in a water bath.

The method may further comprise packaging the sterilized mixture after the step of sterilizing. Specifically, packaging of the sterilized mixture may be performed at 50° C. to 80° C., 50° C. to 70° C., 50° C. to 65° C., 55° C. to 80° C., 55° C. to 70° C., or 55° C. to 65° C.

The method may further comprise cooling the package after the step of packaging. A further aspect of the present invention provides a method of preparing a ketchup, comprising mixing saccharides comprising allulose with a tomato concentrate, vinegar, sodium chloride, and purified water.

Specifically, the method may further comprise sterilizing the mixture after the step of mixing. In addition, the method may further comprise packaging the sterilized mixture after the step of sterilizing. Further, the method may further comprise cooling the package after the packaging process.

The ketchup, the tomato concentrate, the vinegar, the sodium chloride, the purified water, the saccharides comprising allulose, other ingredients, storage stability, mixing, sterilization, packaging, and cooling are as described above.

Effect of the Invention

The ketchup according to the present invention has sensory properties comparable to those of typical ketchups while having lower calorie content and does not undergo change in palatability during storage (for example, storage for up to 12 months after preparation).

In addition, the ketchup according to the present invention has a small change in viscosity and does not undergo dehydration during storage. As a result, the ketchup maintains ease property for use and its quality property without quality deterioration, thereby having prolonged shelf life while inhibiting the growth and development of microorganisms. Therefore, the present invention advantageously provides a ketchup with improved storage stability.

DESCRIPTION OF FIGURES

FIG. 1 shows the results of microbial stability after 14 days of cultivation of the ketchups of Examples and Comparative example.

DETAILED DESCRIPTION OF THE INVENTION

Hereinafter, the present invention will be described in more detail with reference to examples. However, it should be noted that these examples are provided for illustration only and should not be construed in any way as limiting the invention.

Unless otherwise stated, "%" used to indicate concentration of a certain substance refers to % by (weight/weight) for solid/solid, % by (weight/volume) for solid/liquid, and % by (volume/volume) for liquid/liquid, throughout the specification of the present invention.

Preparative Example 1: Preparation of Allulose-Containing Ketchup

Components were mixed in mixing ratios as listed in Table 1, followed by homogenization at 50° C. (Mazela-Z, Eyela Co., Ltd., Japan). Here, as saccharides, allulose was used alone or in combination with high fructose. Then, the resulting mixture was subjected to homogenization (Mazela-Z, Eyela Co., Ltd., Japan) at 95° C. using a thermostat (WCB-22, DAIHAN Scientific Co., Ltd., Korea) and then left for 30 minutes or more, thereby performing sterilization. The sterilized mixture was placed in a container at 60° C. to prevent secondary contamination, followed by cooling at room temperature, thereby preparing ketchups of Examples 1 to 7.

Preparative Example 2: Preparation of High Fructose-Containing Ketchup

Ketchups of Comparative Examples 1 to 3 were prepared in the same manner as in Preparative Example 1 except that, as saccharides, high fructose was used alone and components were mixed together in mixing ratios as listed in Table 1.

As a result, it could be seen that the ketchup of Example 5 was equivalent to the ketchup of Comparative Example 1 in terms of all of the sensory properties, without statistical significance difference therebetween (Table 2).

TABLE 2

|  | Comparative Example 1 | Example 5 | p-value |
|---|---|---|---|
| Sourness intensity | 3.4 | 3.6 | 0.24 |
| Bitterness intensity | 2.0 | 2.1 | 0.79 |
| Off-taste/off-flavor intensity | 1.9 | 1.8 | 0.87 |
| Appearance preference | 3.8 | 3.8 | 0.88 |
| Sourness preference | 3.5 | 3.5 | 1.00 |
| Overall preference | 3.6 | 3.7 | 0.60 |

TABLE 1

| Components | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
|  | Allulose (unit: parts by weight relative to 100 parts by weight of saccharides) | | | | | | | High fructose | High fructose | High fructose |
| (unit: wt %) | 20 | 40 | 60 | 80 | 100 | 60 | 60 | | | |
| Tomato paste | 25.0 | 25.0 | 25.0 | 25.0 | 25.0 | 25.0 | 25.0 | 25.0 | 25.0 | 25.0 |
| Vinegar | 15.0 | 15.0 | 15.0 | 15.0 | 15.0 | 15.0 | 15.0 | 15.0 | 15.0 | 15.0 |
| High fructose (Dried solid) | 16.0 | 12.0 | 8.0 | 4.0 | 0.0 | 4.0 | 12.0 | 20.0 | 10.0 | 30.0 |
| Allulose (Dried solid) | 4.0 | 8.0 | 12.0 | 16.0 | 20.0 | 6.0 | 18.0 | — | — | — |
| Starch | 3.0 | 3.0 | 3.0 | 3.0 | 3.0 | 3.0 | 3.0 | 3.0 | 3.0 | 3.0 |
| Purified salt | 2.5 | 2.5 | 2.5 | 2.5 | 2.5 | 2.5 | 2.5 | 2.5 | 2.5 | 2.5 |
| Onion concentrate | 0.20 | 0.20 | 0.20 | 0.20 | 0.20 | 0.20 | 0.20 | 0.20 | 0.20 | 0.20 |
| Citric acid | 0.05 | 0.05 | 0.05 | 0.05 | 0.05 | 0.05 | 0.05 | 0.05 | 0.05 | 0.05 |
| Sodium L-Glutamate | 0.05 | 0.05 | 0.05 | 0.05 | 0.05 | 0.05 | 0.05 | 0.05 | 0.05 | 0.05 |
| Cinnamon powder | 0.01 | 0.01 | 0.01 | 0.01 | 0.01 | 0.01 | 0.01 | 0.01 | 0.01 | 0.01 |
| Ginger powder | 0.01 | 0.01 | 0.01 | 0.01 | 0.01 | 0.01 | 0.01 | 0.01 | 0.01 | 0.01 |
| Purified water | 34.2 | 34.2 | 34.2 | 34.2 | 34.2 | 44.2 | 24.2 | 34.2 | 44.2 | 24.2 |
| Total | 100 | 100 | 100 | 100 | 100 | 100 | 100 | 100 | 100 | 100 |
| Calorie content (kcal/100 g) | 99.6 | 83.8 | 68.1 | 52.3 | 36.5 | 51.7 | 84.4 | 115.3 | 75.3 | 155.3 |
| Calorie reduction rate* (%) | 13.7 | 27.3 | 41.0 | 54.7 | 68.3 | 31.4 | 45.7 | | | |

※ Tomato paste (tomato 100%, soluble solid content: 24 wt % or more, Heinz, USA), vinegar (CJ CHEILJEDANG, Korea), high fructose (CJ CHEILJEDANG, dried solid fructose content: 55 wt % or more, Korea), allulose (CJ CHEILJEDANG, dried solid allulose content: 95 wt % or more, Korea), starch (CJ CHEILJEDANG, Korea), purified salt (Hanjusalt, Korea), onion concentrate (JFARMS, Korea), citric acid (LOTTEFOODS, Korea), sodium L-Glutamate (CJ CHEILJEDANG, Korea), cinnamon powder (DONGBANG FOODMASTER, Korea), ginger powder (BUMIFOODS, Korea).

Experimental Example 1: Sensory Properties of Allulose-Containing Ketchup

Sensory properties were evaluated by comparing the ketchup containing high fructose alone as saccharides (Comparative Example 1) with the ketchup in which high fructose was replaced with the same amount of allulose (Example 5).

Specifically, mini hotdogs and ketchup samples were provided to 20 trained panelists, each of whom was allowed to freely apply the ketchup samples to the hotdogs and evaluate given properties (appearance preference (color), sweetness intensity, sourness intensity, bitterness intensity, off-taste/off-flavor intensity, sourness preference, and overall preference) after ingestion. (5: very high intensity or preference, 4: high intensity or preference, 3: normal intensity or preference, 2: low intensity or preference, 1: very low intensity or preference). Test results were analyzed using the t-test method and tested at a significance level of $p<0.05$.

Experimental Example 2: Change in Sensory Properties of Allulose-Containing Ketchup During Storage Change in sensory properties of ketchup during storage was evaluated by a triangle test using samples stored for 0, 3, 6, 9, and 12 months after preparation.

A triangle test is the most widely used discriminative method to determine whether there is an overall sensory difference between two samples. The procedure of the triangle test is as follows: A panelist is presented with two identical samples (A) and one different sample (B) (total three samples). The panelist is instructed to taste the samples and identify the odd sample and record his/her answer. Then, the panelist is presented with one A sample and two B samples and then instructed to taste the samples and identify the odd sample and record his/her answer. A result of counting the number of correct answers is compared with a triangle test significance table, thereby analyzing test results.

In Experimental Example 2, first, the triangle test was conducted on 0 and 12 month-old ketchup samples of each of Examples and Comparative Examples. When there was a significant difference in sensory properties between the two ketchup samples, the triangle test was conducted on 0 and 9 month-old ketchup samples. When there was a significant difference in sensory properties between the two ketchup samples, the triangle test was conducted on 0 and 6 month-old ketchup samples. When there was a significant difference in sensory properties between the two ketchup samples, the triangle test was conducted on 0 and 3 month-old ketchup samples. By repeating this procedure, a minimum storage period (the number of months) for which there was no significant difference in sensory properties between two samples of each of Examples and Comparative Examples was found and determined as the shelf life, after which there is a significant difference in sensory properties. In the triangle test, 20 trained panelists were provided with mini hotdogs and ketchup samples and then allowed to freely apply the ketchup samples to the hotdogs and taste the hotdogs. Evaluation results were analyzed based on Roessler's triangle test significance table (Table 3).

TABLE 3

| The number of assessors | the smallest number of correct answers necessary to establish a significant difference | | |
|---|---|---|---|
| | $\alpha = 0.05$ (*) | $\alpha = 0.01$ () | $\alpha = 0.001$ (*) |
| 5 | 4 | 5 | — |
| 6 | 5 | 6 | — |
| 7 | 5 | 6 | 7 |
| 8 | 6 | 7 | 8 |
| 9 | 6 | 7 | 8 |
| 10 | 7 | 8 | 9 |
| 11 | 7 | 8 | 9 |
| 12 | 8 | 9 | 10 |
| 13 | 8 | 9 | 11 |
| 14 | 9 | 10 | 11 |
| 15 | 9 | 10 | 12 |
| 16 | 9 | 11 | 12 |
| 17 | 10 | 11 | 13 |
| 18 | 10 | 12 | 13 |
| 19 | 11 | 12 | 14 |
| 20 | 11 | 13 | 14 |
| 21 | 12 | 13 | 15 |
| 22 | 12 | 13 | 15 |
| 23 | 12 | 14 | 16 |
| 24 | 13 | 14 | 16 |
| 25 | 13 | 15 | 17 |
| 26 | 14 | 15 | 17 |
| 27 | 14 | 16 | 18 |
| 28 | 14 | 16 | 18 |
| 29 | 15 | 17 | 19 |
| 30 | 15 | 17 | 19 |

TABLE 3-continued

| The number of assessors | the smallest number of correct answers necessary to establish a significant difference | | |
|---|---|---|---|
| | $\alpha = 0.05$ (*) | $\alpha = 0.01$ () | $\alpha = 0.001$ (*) |
| 31 | 16 | 17 | 19 |
| 32 | 16 | 18 | 20 |
| 33 | 16 | 18 | 20 |
| 34 | 17 | 19 | 21 |
| 35 | 17 | 19 | 21 |
| 36 | 18 | 20 | 22 |
| 37 | 18 | 20 | 22 |
| 38 | 18 | 20 | 23 |
| 39 | 19 | 21 | 23 |
| 40 | 19 | 21 | 24 |
| 53 | 24 | 27 | 29 |
| 54 | 25 | 27 | 30 |
| 55 | 25 | 27 | 30 |
| 56 | 25 | 28 | 31 |
| 57 | 26 | 28 | 31 |
| 58 | 26 | 29 | 31 |
| 59 | 27 | 29 | 32 |
| 60 | 27 | 29 | 32 |
| 61 | 27 | 30 | 33 |
| 62 | 28 | 30 | 33 |
| 63 | 28 | 31 | 34 |
| 64 | 29 | 31 | 34 |
| 65 | 29 | 32 | 34 |
| 66 | 29 | 32 | 35 |
| 67 | 30 | 32 | 35 |
| 68 | 30 | 33 | 36 |
| 69 | 30 | 33 | 36 |
| 70 | 31 | 34 | 37 |
| 71 | 31 | 34 | 37 |
| 72 | 32 | 34 | 37 |
| 73 | 32 | 35 | 38 |
| 74 | 32 | 35 | 38 |
| 75 | 33 | 35 | 39 |
| 76 | 33 | 36 | 39 |
| 77 | 33 | 36 | 39 |
| 78 | 34 | 37 | 40 |
| 79 | 34 | 37 | 40 |
| 80 | 35 | 37 | 41 |
| 81 | 35 | 38 | 41 |
| 82 | 35 | 38 | 42 |
| 83 | 36 | 39 | 42 |
| 84 | 36 | 39 | 42 |
| 85 | 36 | 39 | 43 |
| 86 | 37 | 40 | 43 |
| 87 | 37 | 40 | 44 |
| 88 | 38 | 41 | 44 |

As a result of analysis, it was confirmed that, for a given amount of saccharides, a ketchup also comprising allulose as saccharides exhibited less change in taste than a ketchup using high fructose alone. In addition, it was confirmed that a ketchup comprising 20 wt % or more of saccharides comprising allulose based on the total weight of the ketchup retained taste 12 months after preparation (Table 4).

TABLE 4

| Elapsed time after preparation | Example 1 | Example 2 | Example 3 | Example 4 | Example 5 | Example 6 | Example 7 | Comp. Example 1 | Comp. Example 2 | Comp. Example 3 |
|---|---|---|---|---|---|---|---|---|---|---|
| 0 month | — | — | — | — | — | — | — | — | — | — |
| 3 months | — | — | — | — | — | — | — | — | X | — |
| 6 months | — | — | — | — | — | — | — | X | ○ | — |
| 9 months | — | — | — | — | — | X | — | ○ | ○ | X |
| 12 months | X | X | X | X | X | ○ | X | ○ | ○ | ○ |

○: significant difference,
X: no significant difference, probability-value: 0.05

Experimental Example 3: Change in Viscosity of Allulose-Containing Ketchup During Storage Change in viscosity of ketchup during storage was measured on each of the ketchup samples of Examples 1 to 5 and Comparative Example 1, which was stored in a refrigerator (at 4° C.) after preparation, using a rapid visco-analyzer (RVA) (viscosity unit: cps). Specifically, 28 g of each refrigerated sample was collected and transferred to a container for the rapid visco-analyzer, followed by measurement of viscosity of the sample at 160 rpm and 25° C. Viscosity of the sample was measured 5 times in total at intervals of 3 month from the date of preparation. Here, measurement was repeated 3 times for each measurement, followed by averaging the measured values. Measurement results were statistically analyzed by analysis of variance (ANOVA) and then were post-tested by Duncan's multiple range test, thereby analyzing storage time-dependent significance.

As a result, it was confirmed that the ketchup of Comparative Example 1 was significantly reduced in viscosity during storage. Conversely, it was confirmed that the ketchup of Example 1 showed a slight decrease in viscosity after storage for 9 to 12 months, and the ketchups of Examples 2 to 5 did not show any significant viscosity change during storage. Therefore, it could be seen that the allulose-containing ketchups according to the present invention had improved storage stability, and, particularly, the allulose-containing ketchups in which the allulose was present in an amount of 40% or more based on the total weight of the saccharides had considerably improved storage stability (Table 5, viscosity unit: cps).

TABLE 5

| Storage time | Immediately after preparation | 3 months | 6 months | 9 months | 12 months |
| --- | --- | --- | --- | --- | --- |
| Comp. Example 1 | 1,859 ± 39$^{ab}$ | 1,905 ± 48$^{a}$ | 1,854 ± 28$^{ab}$ | 1,773 ± 69$^{b}$ | 1,588 ± 39$^{c}$ |
| Example 1 | 1,920 ± 48$^{ab}$ | 1,961 ± 70$^{a}$ | 1,966 ± 27$^{a}$ | 1,889 ± 96$^{ab}$ | 1,769 ± 18$^{b}$ |
| Example 2 | 1,949 ± 63$^{a}$ | 2,009 ± 46$^{a}$ | 2,005 ± 13$^{a}$ | 1,970 ± 43$^{a}$ | 1,922 ± 23$^{a}$ |
| Example 3 | 2,081 ± 89$^{a}$ | 2,040 ± 73$^{a}$ | 2,074 ± 49$^{a}$ | 2,030 ± 55$^{a}$ | 2,017 ± 80$^{a}$ |
| Example 4 | 1,993 ± 3$^{a}$ | 2,023 ± 19$^{a}$ | 1,986 ± 54$^{a}$ | 1,940 ± 51$^{a}$ | 1,916 ± 51$^{a}$ |
| Example 5 | 1,972 ± 54$^{a}$ | 2,052 ± 52$^{a}$ | 1,976 ± 55$^{a}$ | 2,000 ± 74$^{a}$ | 1,957 ± 74$^{a}$ |

※ Each letter (a, b, c) denotes a group of results in the same line, and the presence of a different letter means that there is a significant difference (p < 0.05).

Experimental Example 4: Anti-Dehydration Properties of Allulose-Containing Ketchup Each of the ketchup samples of Examples 1 to 5 and Comparative Example 1, which was stored at room temperature (25° C.), was centrifuged at 4,000 rpm for 10 minutes, followed by measurement of the amount of separated water, thereby determining a storage time-dependent degree of dehydration. Specifically, 5 g of each of the samples stored at room temperature was evenly placed on a container, followed by measurement of water content by an atmospheric heat drying method, the water content of which was known, followed by measurement of the decreasing amount of water subsequent to atmospheric drying at 103° C. Then, 50 g of each of the samples was transferred to a centrifuge container and then centrifuged at 4000 rpm and 25° C. for 10 minutes. A dehydration rate was calculated according to Equation 1. Measurement results were statistically analyzed by ANOVA and then post-tested by Duncan's multiple range test, thereby analyzing storage time-dependent significance.

Dehydration rate(%)={(weight of sample before centrifugation(g)−weight of sample after centrifugation for removal of water(g))/(weight of sample before centrifugation(g)×water content (%))}×100   <Equation 1>

As a result, it was confirmed that the ketchups of Example 1 to 5 had significantly low dehydration rate, as compared with the ketchup of Comparative Example 1. Particularly, a difference in dehydration rate between the ketchups of Example 1 to 5 and the ketchup of Comparative Example 1 became greater with increasing storage time. It was confirmed that the ketchup of Comparative Example 1 had a dehydration rate twice or more those of the ketchups of Example 1 to 5, as measured after storage for 12 months (Table 6).

TABLE 6

| Unit, % | Immediately after preparation | After 3 months | After 6 months | After 9 months | After 12 months |
| --- | --- | --- | --- | --- | --- |
| Comparative Example 1 | 0.4$^{A}$ | 0.8$^{A}$ | 1.7$^{A}$ | 2.2$^{A}$ | 3.1$^{A}$ |
| Example 1 | 0.2$^{AB}$ | 0.5$^{B}$ | 1.0$^{BC}$ | 1.1$^{C}$ | 1.5$^{B}$ |
| Example 2 | 0.1$^{B}$ | 0.4$^{B}$ | 0.9$^{C}$ | 1.1$^{C}$ | 1.3$^{B}$ |
| Example 3 | 0.1$^{B}$ | 0.4$^{B}$ | 0.9$^{C}$ | 1.4$^{B}$ | 1.1$^{C}$ |
| Example 4 | 0.2$^{AB}$ | 0.4$^{B}$ | 1.0$^{BC}$ | 1.1$^{C}$ | 1.5$^{B}$ |
| Example 5 | 0.1$^{B}$ | 0.4$^{B}$ | 1.1$^{B}$ | 1.3$^{B}$ | 1.5$^{B}$ |

※ Each letter (A, B, C) denotes a group of results in the same column, and the presence of a different letter means that there is a significant difference (p < 0.05).

Experimental Example 5: Microbial Stability of Allulose-Containing Ketchup During Storage Microbial stability of ketchup depending on the kind and amount of saccharides was evaluated through confirmation of inhibition of the growth and development of *Lactobacillus fructivorans*, which is known to be a major contaminant of ketchup. Specifically, *Lactobacillus fructivorans* (KCCM 40758, Korean Culture Center of Microorganisms) was subcultured three times in MRS medium (Table 7) to enhance activity. Liquid MRS medium was inoculated with the cultured strain, followed by inducing over-cultivation to a concentration of 10$^7$ CFU/mL or more, thereby preparing a strain mother liquor. Then, 300 g of each of the ketchup samples of Examples 1, 3, 5 and Comparative Example 1 was inoculated with 3 g of the strain mother liquor, which in turn was stored in a thermostat incubator at 30° C. Samples were taken after 0, 7, and 14 days from the starting date of storage and then smeared on an MRS agar medium, followed by counting single colonies. In measurement of the number of single colonies, 1 g of each of the ketchup samples was mixed with 9 g of 0.9% sterilized physiological saline and then gradually diluted by the 10-fold dilution method to be used as a sample. Then, 100 μg of the sample was smeared on a surface of the MRS agar medium and cultured at 30° C. for 3 days, followed by counting single colonies. A bacterial cell mass was calculated by multiplying the measured number of colonies by a dilution factor and expressed in CFU (colony forming unit) per gram of sample.

TABLE 7

| | |
|---|---|
| Glucose | 20.0 g |
| Protease peptone | 10.0 g |
| Beef extract | 10.0 g |
| Yeast extract | 5.0 g |
| Tween 80 | 1.0 g |
| Ammonium citrate | 2.0 g |
| Sodium acetate | 5.0 g |
| $K_2HPO_4$ | 2.0 g |
| $MgSO_4*7H_2O$ | 0.1 g |
| $MnSO_4*4H_2O$ | 0.05 g |
| Distilled water | Up to 1.0 L |
| pH | About 6.5 |

As a result, it was confirmed that the bacterial cell mass value of the ketchup of Comparative Example 1, as measured after storage for 14 days, increased to 158% of an initial value (the bacterial cell mass after storage for 0 day: $5.3 \times 10^7$ CFU/ml, the bacterial cell mass after storage for 14 days: $8.3 \times 10^7$ CFU/g), whereas the bacterial cell mass values of the ketchups of Examples 1, 3, 5, as measured after storage for 14 days, were changed to 17% to 132% of initial values. Thus, it could be seen that, in the ketchups of Examples 1, 3, 5, the growth and development of microorganisms were relatively suppressed, as compared with those in the ketchup of Comparative Example 1. Particularly, in the ketchup of Example 5, the bacterial cell mass after 14 days of cultivation ($9.0 \times 10^6$ CFU/g) decreased by about 1 log, as compared with an initial value ($5.3 \times 10^7$ CFU/g). Thus, it was confirmed that the ketchup containing allulose alone as saccharides had significantly good microbial stability (FIG. 1).

What is claimed is:

1. A ketchup, comprising a tomato concentrate, saccharides comprising allulose, vinegar, sodium chloride and purified water, wherein the tomato concentrate is present in an amount of 20 parts by weight to 80 parts by weight and the saccharides are present in an amount of 10 parts by weight to 40 parts by weight relative to 100 parts by weight of the ketchup,
   wherein a soluble solid content of the tomato concentrate is 24 wt % or more than 24 wt % based on the weight of the tomato concentrate,
   wherein the allulose is present in an amount of 40 parts by weight to 100 parts by weight relative to 100 parts by weight of the saccharides in terms of dry solid content.

2. The ketchup according to claim 1, wherein the tomato concentrate is present in an amount of 20 parts by weight to 50 parts by weight relative to 100 parts by weight of the ketchup.

3. The ketchup according to claim 1, wherein the saccharides are present in an amount of 20 parts by weight to 30 parts by weight relative to 100 parts by weight of the ketchup.

4. The ketchup according to claim 1, wherein the vinegar is present in an amount of 5 parts by weight to 30 parts by weight relative to 100 parts by weight of the ketchup.

5. A method for improving preservability of a ketchup, comprising:
   mixing saccharides comprising allulose with a tomato concentrate, vinegar, sodium chloride and purified water,
   wherein the tomato concentrate is present in an amount of 20 parts by weight to 80 parts by weight and the saccharides are present in an amount of 10 parts by weight to 40 parts by weight relative to 100 parts by weight of the ketchup,
   wherein a soluble solid content of the tomato concentrate is 24 wt % or more than 24 wt % based on the weight of the tomato concentrate,
   wherein the allulose is present in an amount of 40 parts by weight to 100 parts by weight relative to 100 parts by weight of the saccharides in terms of dry solid content.

* * * * *

(12) EX PARTE REEXAMINATION CERTIFICATE (12735th)
United States Patent
Lee et al.

(10) Number: US 10,980,261 C1
(45) Certificate Issued: Oct. 16, 2024

(54) TOMATO KETCHUP WITH IMPROVED STORAGE STABILITY

(71) Applicant: CJ CHEILJEDANG CORPORATION, Seoul (KR)

(72) Inventors: In Lee, Suwon-si (KR); Seung Won Park, Yongin-si (KR); Sung Bae Byun, Sejong (KR); Dong Seok Shim, Yongin-si (KR); Dong-Chul Jung, Seoul (KR); Jong Min Choi, Suwon-si (KR)

(73) Assignee: CJ CHEILJEDANG CORPORATION, Seoul (KR)

Reexamination Request:
No. 90/015,281, Aug. 30, 2023

Reexamination Certificate for:
Patent No.: 10,980,261
Issued: Apr. 20, 2021
Appl. No.: 16/335,626
PCT Filed: Sep. 12, 2017
PCT No.: PCT/KR2017/009982
§ 371 (c)(1),
(2) Date: Mar. 21, 2019
PCT Pub. No.: WO2018/066825
PCT Pub. Date: Apr. 12, 2018

(51) Int. Cl.
*A23L 27/60* (2016.01)
*A23L 3/3562* (2006.01)
*A23L 27/40* (2016.01)
*C12J 1/00* (2006.01)

(52) U.S. Cl.
CPC ............ *A23L 27/63* (2016.08); *A23L 3/3562* (2013.01); *A23L 27/40* (2016.08); *C12J 1/00* (2013.01); *A23V 2002/00* (2013.01)

(58) Field of Classification Search
None
See application file for complete search history.

(56) References Cited

To view the complete listing of prior art documents cited during the proceeding for Reexamination Control Number 90/015,281, please refer to the USPTO's Patent Electronic System.

*Primary Examiner* — Timothy J. Kugel

(57) ABSTRACT

The present application relates to tomato ketchup with improved storage stability and a method for enhancing the storage stability of ketchup.

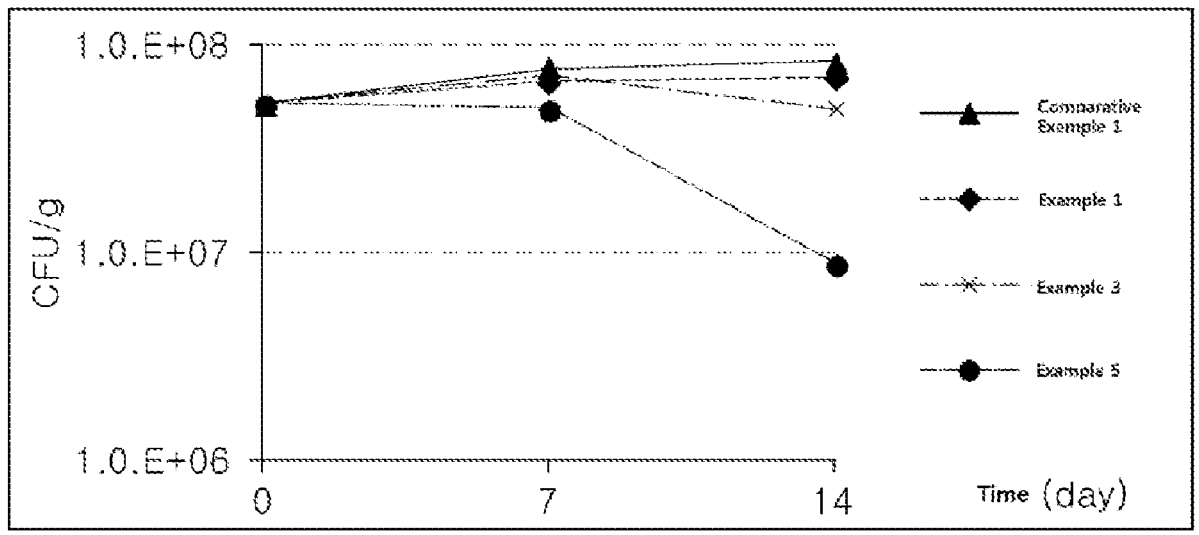

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-5 is confirmed.

New claims 6-20 are added and determined to be patentable.

*6. The ketchup according to claim 1, wherein the allulose is present in an amount of 60 parts by weight to 100 parts by weight relative to 100 parts by weight of the saccharides in terms of dry solid content.*

*7. The ketchup according to claim 6, wherein the allulose is present in an amount of 80 parts by weight to 100 parts by weight relative to 100 parts by weight of the saccharides in terms of dry solid content.*

*8. The ketchup according to claim 1, wherein the allulose is present in an amount of 40 parts by weight to 80 parts by weight relative to 100 parts by weight of the saccharides in terms of dry solid content.*

*9. The ketchup according to claim 8, wherein the allulose is present in an amount of 40 parts by weight to 60 parts by weight relative to 100 parts by weight of the saccharides in terms of dry solid content.*

*10. The ketchup according to claim 8, wherein the allulose is present in an amount of 60 parts by weight to 80 parts by weight relative to 100 parts by weight of the saccharides in terms of dry solid content.*

*11. The ketchup according to claim 1, wherein the saccharides are present in an amount of 10 parts by weight to 30 parts by weight relative to 100 parts by weight of the ketchup.*

*12. The ketchup according to claim 11, wherein the tomato concentrate is present in an amount of 20 parts by weight to 30 parts by weight relative to 100 parts by weight of the ketchup.*

*13. The ketchup according to claim 1, wherein the saccharides are free from one or more of sucrose, fructose, and starch syrup.*

*14. The method according to claim 5, wherein the saccharides are present in an amount of 20 parts by weight to 30 parts by weight relative to 100 parts by weight of the ketchup.*

*15. The method according to claim 5, wherein the allulose is present in an amount of 60 parts by weight to 100 parts by weight relative to 100 parts by weight of the saccharides in terms of dry solid content.*

*16. The method according to claim 15, wherein the allulose is present in an amount of 80 parts by weight to 100 parts by weight relative to 100 parts by weight of the saccharides in terms of dry solid content.*

*17. The method according to claim 5, wherein the allulose is present in an amount of 40 parts by weight to 80 parts by weight relative to 100 parts by weight of the saccharides in terms of dry solid content.*

*18. The method according to claim 17, wherein the allulose is present in an amount of 40 parts by weight to 60 parts by weight relative to 100 parts by weight of the saccharides in terms of dry solid content.*

*19. The method according to claim 5, wherein the saccharides are present in an amount of 10 parts by weight to 30 parts by weight relative to 100 parts by weight of the ketchup.*

*20. The method according to claim 5, wherein the saccharides are free from one or more of sucrose, fructose, and starch syrup.*

\* \* \* \* \*